United States Patent
Park et al.

(10) Patent No.: US 9,236,759 B2
(45) Date of Patent: Jan. 12, 2016

(54) CHARGING APPARATUS AND WIRELESS CHARGING APPARATUS

(71) Applicant: SAMSUNG ELECTRO-MECHANICS CO., LTD., Suwon, Gyunggi-do (KR)

(72) Inventors: Yong Woon Park, Gyeonggi-do (KR); Chang Mok Han, Gyunggi-do (KR); Tae Sung Kim, Gyunggi-do (KR); Jae Suk Sung, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 315 days.

(21) Appl. No.: 13/829,559

(22) Filed: Mar. 14, 2013

(65) Prior Publication Data

US 2014/0132209 A1    May 15, 2014

(30) Foreign Application Priority Data

Nov. 15, 2012  (KR) .................. 10-2012-0129379

(51) Int. Cl.
*H02J 7/00* (2006.01)
*H02J 7/02* (2006.01)
*H02J 5/00* (2006.01)

(52) U.S. Cl.
CPC .............. *H02J 7/025* (2013.01); *H02J 7/0047* (2013.01); *H02J 5/005* (2013.01)

(58) Field of Classification Search
CPC ............ H02J 7/025; H02J 7/027; H02J 7/42; H02J 7/45; H02J 7/67; Y02E 60/12
USPC ......... 320/107, 108, 103, 109, 114, 132, 165; 307/104, 141, 125, 141.4, 147
See application file for complete search history.

(56) References Cited

U.S. PATENT DOCUMENTS 3,986,009 A * 10/1976 Fastaia .................. 701/101
7,772,802 B2    8/2010 Manico et al.

(Continued)

FOREIGN PATENT DOCUMENTS

KR     1994-0010441 A     5/1994
KR     10-2008-0032519 A  4/2008

(Continued)

OTHER PUBLICATIONS

Notice of Office Action Korean Patent Application No. 10-2012-0129379 dated Jan. 20, 2014 with English translation.

*Primary Examiner* — Edward Tso
*Assistant Examiner* — Alexis A Boateng
(74) *Attorney, Agent, or Firm* — NSIP Law

(57) ABSTRACT

There is provided a charging apparatus and a wireless charging apparatus that facilitate display of a fully charged state using a monochromatic display device. The charging apparatus and the wireless charging apparatus include a power supply unit supplying a charging power, a charging unit supplying the charging power to an external charging target device, a charging control unit controlling a charging state of the charging unit, a display unit that displays the charging state under the control of the charging control unit and, when the charging target device is in a fully charged state, stops an operation of displaying the charging state, and a delay unit that delays stopping the operation of the display unit that displays the charging state, for a previously set period of time, when the charging target device in the fully charged state is recharged.

11 Claims, 4 Drawing Sheets

(56) References Cited

U.S. PATENT DOCUMENTS

| | | | |
|---|---|---|---|
| 8,072,729 B1* | 12/2011 | Holley | 361/195 |
| 2009/0051320 A1* | 2/2009 | Muntermann | 320/116 |
| 2010/0188041 A1* | 7/2010 | Mizuo | 320/108 |
| 2011/0115432 A1* | 5/2011 | El-Maleh et al. | 320/108 |
| 2011/0234115 A1* | 9/2011 | Shimizu et al. | 315/287 |
| 2012/0161697 A1* | 6/2012 | Park et al. | 320/108 |
| 2012/0214462 A1* | 8/2012 | Chu et al. | 455/418 |

FOREIGN PATENT DOCUMENTS

| | | |
|---|---|---|
| KR | 10-2009-0017036 A | 2/2009 |
| KR | 10-2009-0113732 A | 11/2009 |
| KR | 10-2010-0015828 A | 2/2010 |
| WO | 2008/044875 A1 | 4/2008 |

* cited by examiner

CHARGING APPARATUS AND WIRELESS CHARGING APPARATUS

CROSS-REFERENCE TO RELATED APPLICATIONS

This application claims the priority of Korean Patent Application No. 10-2012-0129379 filed on Nov. 15, 2012, in the Korean Intellectual Property Office, the disclosure of which is incorporated herein by reference.

BACKGROUND OF THE INVENTION

1. Field of the Invention

The present invention relates to a charging apparatus and a wireless charging apparatus that facilitate display of charging.

2. Description of the Related Art

In general, power supply apparatuses, supplying driving power necessary for operating electronic apparatuses, are essential.

Such power supply apparatuses may usually convert commercial alternating current (AC) power into direct current (DC) driving power and supply the driving power to electronic apparatuses.

As described above, in a case in which rechargeable batteries, able to be recharged with mains power and supply stored driving power to electronic apparatuses, are employed, charging apparatuses may be employed so as to supply power to rechargeable batteries.

Such charging apparatuses may be directly connected to an electronic apparatuses via a connector, or the like, to supply power to rechargeable batteries embedded in electronic apparatuses or may supply power to rechargeable batteries embedded in electronic apparatuses in a non-contact manner through utilizing a magnetic induction effect.

The charging apparatuses may include a display unit containing a light source such as a light emitting diode to display a charging state.

In a monochromatic light emitting diode, when a fully charged electronic apparatus is reconnected after being controlled for a predetermined period of time, there may be a problem in that a fully charged state of the fully charged electronic apparatuses may not be displayed. To display the fully charged state, in a case in which a plurality of light emitting diodes are used as disclosed in the related art document below, manufacturing costs incurred in configuring the plurality of light emitting diodes may be problematically increased.

RELATED ART DOCUMENT

Korean Patent Laid-Open Publication No. 10-2009-0113732

SUMMARY OF THE INVENTION

An aspect of the present invention provides a charging apparatus and a wireless charging apparatus that facilitate a fully charged display using a monochromatic display device when a fully charged device is recharged.

According to an aspect of the present invention, there is provided a charging apparatus including: a power supply unit supplying charging power; a charging unit supplying the charging power from the power supply unit to an external charging target device; a charging control unit controlling a charging state of the charging unit; a display unit that displays the charging state under the control of the charging control unit and, when the charging target device is in a fully charged state, stops an operation of displaying the charging state; and a delay unit that delays stopping the operation of the display unit that displays the charging state, for a previously set period of time, when the charging target device in the fully charged state is recharged.

The display unit may be a monochromatic light emitting diode.

The charging apparatus may further include: a detection unit detecting a state of the charging power supplied to the charging unit from the power supply unit.

The display unit may emit light of a previously set color when the charging target device is charged, and may stop emitting light when the charging target device is fully charged.

The delay unit may include: a switch connected to the display unit in parallel; a first resistor connected between an input terminal of a control signal of the charging control unit and a drain of the switch; a diode connected between the drain of the switch and the first resistor to transmit the control signal; and a second resistor and a capacitor connected to a gate of the switch and determining a delay time along with a gate-source threshold voltage of the switch.

According to another aspect of the present invention, there is provided a wireless charging apparatus including: a power supply unit supplying charging power; a charging unit supplying the charging power from the power supply unit to an external charging target device in a previously set wireless manner; a charging control unit that controls a charging state of the charging unit; a display unit that displays the charging state under the control of the charging control unit and, when the charging target device is in a fully charged state, stops an operation of displaying the charging state; and a delay unit that delays stopping the operation of the display unit that displays the charging state, for a previously set period of time, when the charging target device in the fully charged state is recharged.

The charging unit may include: a coil unit transmitting the charging power to the charging target device according to a magnetic induction effect; and a switching unit that controls an operation of the coil unit transmitting the charging power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
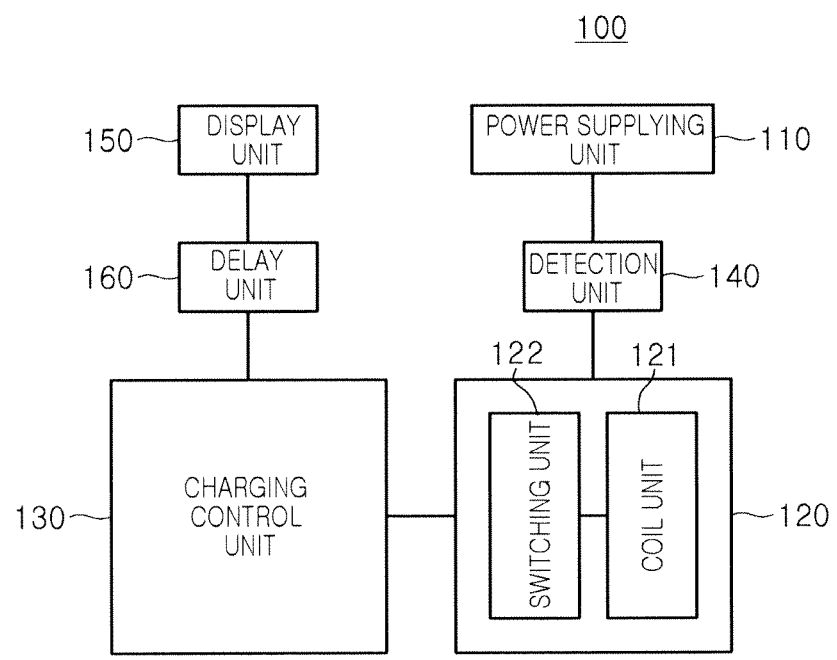
FIG. 1 is a schematic block diagram of a charging apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

A case in which any one part is connected with another part includes a case in which the parts are directly connected with each other and a case in which the parts are indirectly connected with each other with other elements interposed therebetween.

In addition, unless explicitly described otherwise, "comprising" any components will be understood to imply the inclusion of other components but not the exclusion of any other components.

In the drawings, the shapes and dimensions of elements may be exaggerated for clarity, and the same reference numerals will be used throughout to designate the same or like elements.

FIG. 1 is a schematic block diagram of a charging apparatus 100 according to an embodiment of the present invention.

Referring to FIG. 1, the charging apparatus 100 according to an embodiment of the present invention may include a power supply unit 110, a charging unit 120, a charging control unit 130, a detection unit 140, a display unit 150, and a delay unit 160.

The power supply unit 110 may supply a previously set charging power, and, although not shown, convert an input power into the charging power. The input power may be a common alternating current power or a direct current power.

To this end, although not shown, the power supply unit 110 may include a rectification circuit that rectifies the common alternating current power, a power factor correction circuit that adjusts a phase difference between a voltage and a current of the rectified power and corrects a power factor.

The charging unit 120 may supply the charging power supplied by the power supply unit 110 to an external charging target device.

In a case in which the charging apparatus 100 according to the embodiment of the present invention is a general wired charging apparatus, the charging unit 120 may supply the charging power to a charging target device connected to a connection terminal such as a connector. In a case in which the charging apparatus 100 according to the embodiment of the present invention is a wireless charging apparatus, the charging unit 120 may supply the charging power to the charging target device in a previously set wireless manner.

To this end, the charging unit 120 may include a coil unit 121 and a switching unit 122.

The coil unit 121 may include at least one coil and supply the charging power to the charging target device by using a magnetic induction method.

To this end, the charging target device may also include a receiving circuit used to receive the charging power from the coil unit 121 by using the magnetic induction method.

The coil unit 121 may include a plurality of coils according to a power level of the charging power to be supplied.

The switching unit 122 may switch an amplification action of the coil unit 121 and include switches corresponding to the number of coils of the coil unit 121.

A switching operation of the switching unit 122 may be controlled by the charging control unit 130.

The charging control unit 130 may control a charging operation of the charging unit 120, and further control a display of a charging state of the charging target device.

To this end, the charging control unit 130 may be a microprocessor in which a software code for the above-mentioned operations is input.

The above-described charging control unit 130 may control the following charging operations having five modes.

Among the charging operations having five modes, first is a standby mode in which power is connected but charging is not performed, second is a power supply mode in which charging is performed, third is a fully charged mode in which charging is fully performed, fourth is a fault mode indicating an abnormal operation such as a temperature increase during charging, and fifth is a foreign object detection (FOD) mode indicating an abnormal operation by detecting interference of foreign objects such as a conductor between the charging apparatus 100 and the charging target apparatus during charging.

The detection unit 140 may detect a state of the charging power supplied to the charging unit 120 from the power supply unit 110. More specifically, the detection unit 140 may detect whether the charging power supplied to the charging unit 120 from the power supply unit 110 corresponds to a previously set normal state or a shunt state.

The display unit 150 may display a charging state of the charging target device under the charging display control of the charging control unit 130.

In more detail, the display unit 150 may be a monochromatic light emitting diode, may emit light of a previously set color in a case in which the charging target device is being charged and stop emitting light in a fully charged state in which the charging target device is fully charged, under the charging display control of the charging control unit 130.

Although the above-described display unit 150 may stop emitting light in the case in which the charging target device is fully charged under the charging display control of the charging control unit 130, in a case in which the charging target device, fully charged by a different charging device, is charged, the display unit 150 stops emitting light, which make it difficult to clearly display whether the charging target device and the charging apparatus 100 normally operate or the charging target device is in the fully charged state.

Accordingly, the delay unit 160 may delay the operation of the display unit 150, that is, the operation of stopping emission of light.

Figure 2:
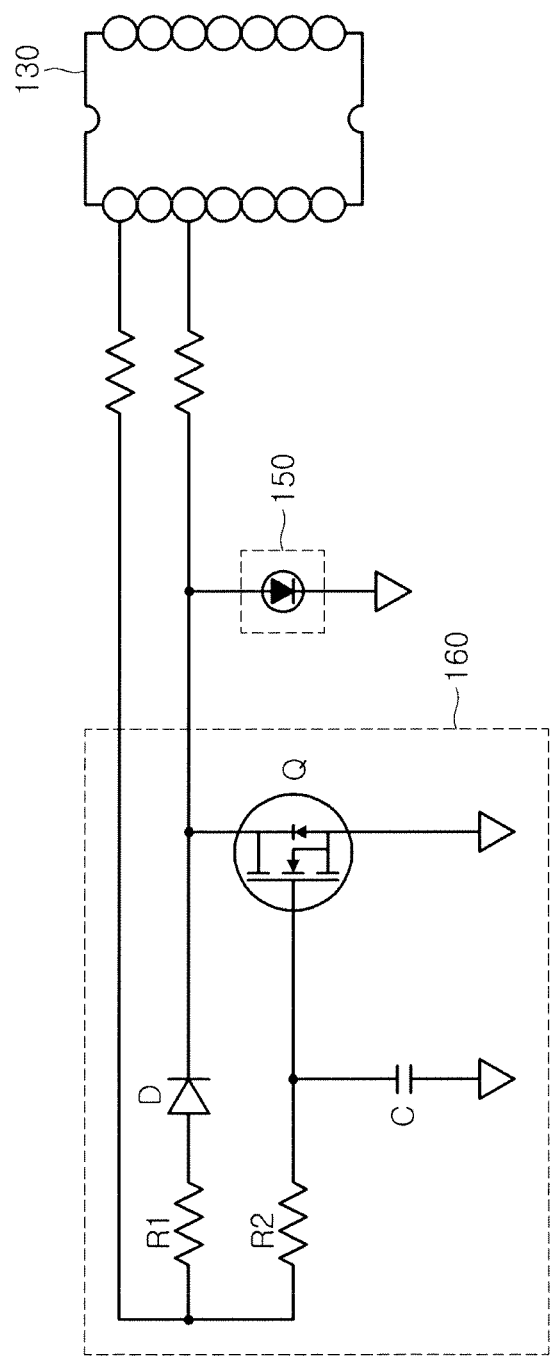
FIGS. 2 and 3 are schematic circuit diagrams of a part of the charging apparatus of FIG. 1.
Figure 3:
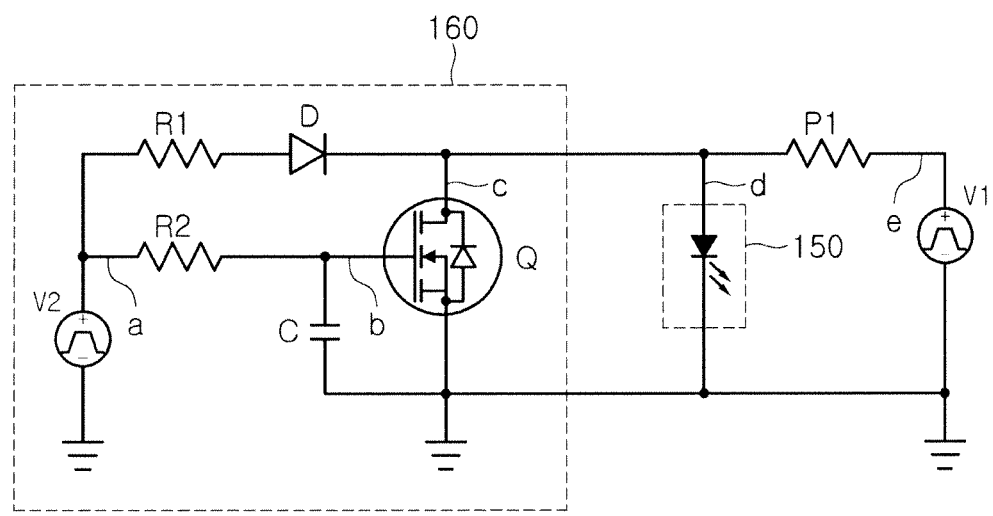

FIGS. 2 and 3 are schematic circuit diagrams of a part of the charging apparatus of FIG. 1.

FIG. 2 is a schematic circuit diagram of the charging control unit 130, the display unit 150, and the delay unit 160 of the charging apparatus 100 according to an embodiment of the present invention. FIG. 3 is a schematic circuit diagram for providing simulation operation waveforms of the display unit 150 and the delay unit 160 of the charging apparatus 100 of FIG. 4.

Referring to FIG. 2, the delay unit 160 may include first and second resistors R1 and R2, a diode D, a capacitor C, and a switch Q.

The switch Q may be connected in parallel to a monochromatic light emitting diode of the display unit 150 and may be an N-type MOS FET.

The first resistor R1 and the diode D may be connected in series between a signal terminal transmitting a second display signal V2 among signals of the control unit 130 and a drain of the switch Q. The second resistor R2 and the capacitor C may be connected to a gate of the switch Q. The capacitor C may be connected to a ground. The second resistor R2 may be connected to the signal terminal transmitting the second display signal V2.

Meanwhile, a first display signal V1 among the signals of the control unit 130 may be transmitted to the monochromatic light emitting diode of the display unit 150.

Figure 4:
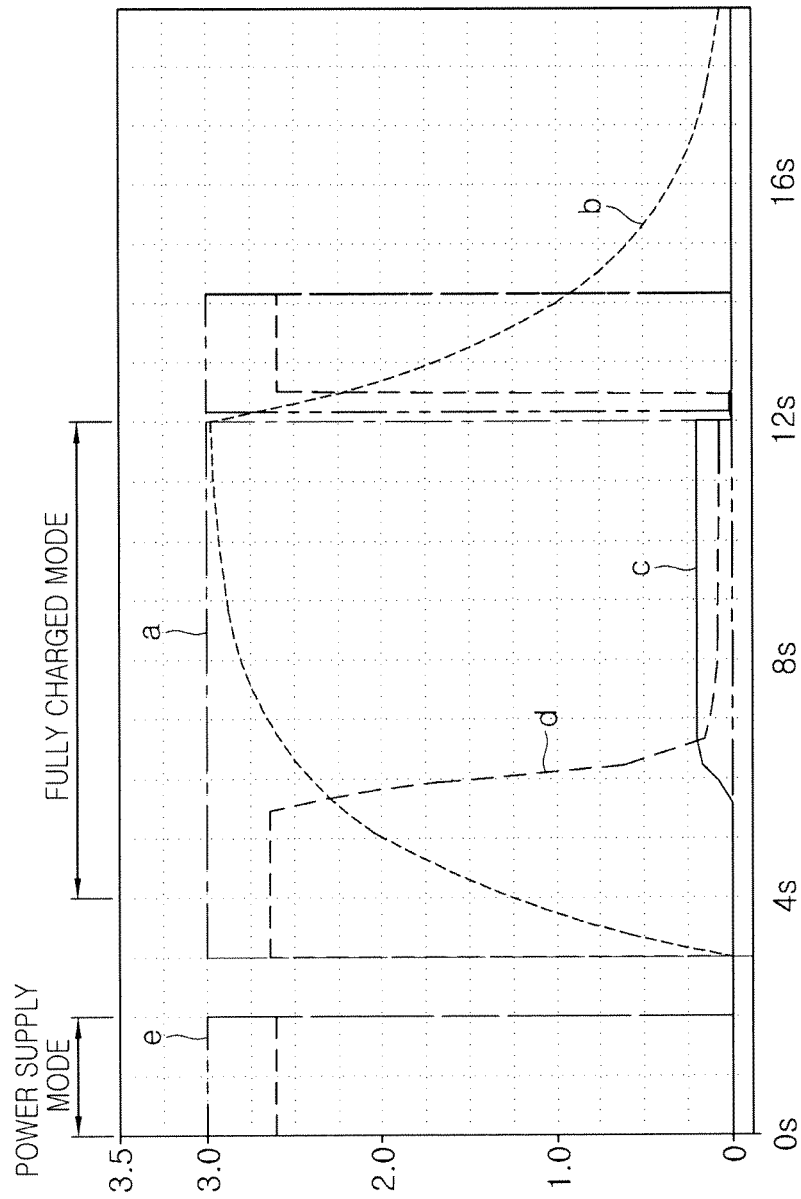
FIG. 4 is a graph showing a voltage waveform of a main part of a portion of the charging apparatus of FIG. 3.

FIG. 4 is a graph showing a voltage waveform of a main part of a portion of the charging apparatus of FIG. 3 according to the embodiment of the present invention.

Referring to FIG. 4 along with FIG. 3, the above-described charging operation modes may be displayed by the first and second display signals V1 and V2 from the charging control unit 130.

That is, when signal levels of the first and second display signals V1 and V2 respectively have a low level, a first mode, a standby mode, may be displayed. When the first display signal V1 has a high level and the second display signal V2 has a low level, a second mode, a power supply mode, may be displayed. When the first display signal V1 has a low level and the second display signal V2 has a high level, a third mode, a fully charged mode, may be displayed.

Accordingly, the second display signal V2 is connected to a gate of the switch Q, and a delay time is determined by a threshold voltage between the gate and source of the switch Q and time constants of the second resistor R2 and the capacitor C. When a charging target device in a fully charged state is recharged, the display unit 150 may perform an operation of emitting light during the delay time and then stop the operation of emitting light.

In this regard, referring to FIG. 4, a monochromatic light emitting diode of the display unit 150 is turned on for a predetermined period of time and then turned off (d) by the first display signal V1 (e) and the second display signal V2 (a); a signal transmission is delayed (b, c) according to the delay time determined by the threshold voltage between the gate and source of the switch Q and time constants of the second resistor R2 and the capacitor C; and when the charging target device in a fully charged state is recharged, the light emitting diode lights up for a predetermined period of time, and then automatically turns off, and thus the fully charged state may be displayed.

As described above, according to embodiments of the invention, when a fully charged device is recharged using a monochromatic display device, the display device lights up for a predetermined period of time and then turns off, which facilitates display of a fully charged state of the fully charged device using the monochromatic display device, and manufacturing cost is reduced by employing the monochromatic display device.

In addition, although a microprocessor is mainly employed to control an operation of a display device, in the embodiment of the present invention, an operation of the display device may be controlled by using a simple passive circuit without changing a software code while excluding control of the microprocessor, thereby efficiently using a limited memory capacity of the microprocessor.

Furthermore, when a fully charged state is displayed, an operation of emitting light is automatically stopped, thereby reducing power consumption necessary for displaying a power state.

As set forth above, according to the embodiments of the invention, when a fully charged device is recharged using a monochromatic display device, the display device lights up for a predetermined period of time and then turns off, which facilitates display of a fully charged state of a device using the monochromatic display device, and manufacturing cost is reduced by employing the monochromatic display device.

While the present invention has been shown and described in connection with the embodiments, it will be apparent to those skilled in the art that modifications and variations can be made without departing from the spirit and scope of the invention as defined by the appended claims.

What is claimed is:

1. A charging apparatus comprising:
a power supply unit supplying charging power;
a charging unit supplying the charging power from the power supply unit to an external charging target device;
a charging control unit controlling a charging state of the charging unit;
a display unit that displays the charging state under the control of the charging control unit and, when the charging target device is in a fully charged state, stops an operation of displaying the charging state; and
a delay unit that delays stopping the operation of the display unit that displays the charging state, during a previously set period of time, when the charging target device in the fully charged state is recharged.

2. The charging apparatus of claim 1, wherein the display unit is a monochromatic light emitting diode.

3. The charging apparatus of claim 1, further comprising a detection unit detecting a state of the charging power supplied to the charging unit from the power supply unit.

4. The charging apparatus of claim 2, wherein the display unit emits light of a previously set color when the charging target device is charged, and stops emitting light when the charging target device is fully charged.

5. The charging apparatus of claim 1, wherein the delay unit includes:
a switch connected to the display unit in parallel;
a first resistor connected between an input terminal of a control signal of the charging control unit and a drain of the switch;
a diode connected between the drain of the switch and the first resistor to transmit the control signal; and
a second resistor and a capacitor connected to a gate of the switch and determining a delay time along with a gate-source threshold voltage of the switch.

6. A wireless charging apparatus comprising:
a power supply unit supplying charging power;
a charging unit supplying the charging power from the power supply unit to an external charging target device in a previously set wireless manner;
a charging control unit that controls a charging state of the charging unit;
a display unit that displays the charging state under the control of the charging control unit and, when the charging target device is in a fully charged state, stops an operation of displaying the charging state; and
a delay unit that delays stopping the operation of the display unit that displays the charging state, for a previously set period of time, when the charging target device in the fully charged state is recharged.

7. The wireless charging apparatus of claim 6, wherein the charging unit includes:
a coil unit transmitting the charging power to the charging target device according to a magnetic induction effect; and
a switching unit that controls an operation of the coil unit transmitting the charging power.

8. The wireless charging apparatus of claim 6, wherein the display unit is a monochromatic light emitting diode.

9. The wireless charging apparatus of claim 6, further comprising a detection unit detecting a state of the charging power supplied to the charging unit from the power supply unit.

10. The wireless charging apparatus of claim 8, wherein the display unit emits light of a previously set color when the charging target device is charged, and stops emitting light when the charging target device is fully charged.

11. The wireless charging apparatus of claim 6, wherein the delay unit includes:
- a switch connected to the display unit in parallel;
- a first resistor connected between an input terminal of a control signal of the charging control unit and a drain of the switch;
- a diode connected between the drain of the switch and the first resistor to transmit the control signal; and
- a second resistor and a capacitor connected to a gate of the switch and determining a delay time along with a gate-source threshold voltage of the switch.

* * * * *